United States Patent
Parsons et al.

(10) Patent No.: US 12,475,407 B2
(45) Date of Patent: Nov. 18, 2025

(54) PREDICTING TOPIC SENTIMENT USING A MACHINE LEARNING MODEL TRAINED WITH OBSERVATIONS IN WHICH THE TOPICS ARE MASKED

(71) Applicant: Providence St. Joseph Health, Seattle, WA (US)

(72) Inventors: Guilford T. Parsons, Seattle, WA (US); Kaitlin Claveau, Westminster, CO (US)

(73) Assignee: Providence St. Joseph Health, Renton, WA (US)

( * ) Notice: Subject to any disclaimer, the term of this patent is extended or adjusted under 35 U.S.C. 154(b) by 1032 days.

(21) Appl. No.: 17/081,277

(22) Filed: Oct. 27, 2020

(65) Prior Publication Data
US 2022/0129784 A1 Apr. 28, 2022

(51) Int. Cl.
*G06N 20/00* (2019.01)
*G06F 40/40* (2020.01)
*G16H 10/20* (2018.01)
*G16H 50/20* (2018.01)

(52) U.S. Cl.
CPC ............ *G06N 20/00* (2019.01); *G06F 40/40* (2020.01); *G16H 10/20* (2018.01); *G16H 50/20* (2018.01)

(58) Field of Classification Search
CPC . G06N 3/08; G06N 3/09; G06N 20/00; G06F 40/40; G16H 10/20; G16H 50/20
See application file for complete search history.

(56) References Cited

U.S. PATENT DOCUMENTS

| | | | | |
|---|---|---|---|---|
| 12,210,836 | B2* | 1/2025 | Batra | G06F 16/953 |
| 2011/0112995 | A1* | 5/2011 | Chang | G06N 20/00 |
| | | | | 706/50 |
| 2017/0270096 | A1* | 9/2017 | Sheafer | G06F 40/295 |
| 2019/0356956 | A1* | 11/2019 | Sheng | H04N 21/4665 |
| 2019/0370604 | A1* | 12/2019 | Galitsky | G06V 10/7747 |
| 2019/0378179 | A1* | 12/2019 | Cleverley | G06Q 50/01 |
| 2021/0312124 | A1* | 10/2021 | Agarwal | G06F 40/30 |

OTHER PUBLICATIONS

Huang, Kexin, Jaan Altosaar, and Rajesh Ranganath. "Clinicalbert: Modeling clinical notes and predicting hospital readmission." arXiv preprint arXiv:1904.05342v2 (Apr. 2019). (Year: 2019).*

Chen, Long. "Assertion detection in clinical natural language processing: a knowledge-poor machine learning approach." 2019 IEEE 2nd International Conference on Information and Computer Technologies (ICICT). IEEE, May 2019. (Year: 2019).*

(Continued)

*Primary Examiner* — Randall K. Baldwin
(74) *Attorney, Agent, or Firm* — Arnold & Porter Kaye Scholer LLP

(57) ABSTRACT

A facility for determining sentiments expressed by a natural-language text string for each of one or more topics is described. In the natural-language text string, the facility identifies one or more topics. For each identified topic, the facility replaces the topic in the natural-language text string with a masking tag that occupies the same position in the natural-language text string as the topic. After the replacing, the facility applies a machine learning model to the natural-language text string to obtain a predicted sentiment for each of the identified topics.

11 Claims, 5 Drawing Sheets

(56) References Cited

OTHER PUBLICATIONS

Zhang, Denghui, et al. "E-BERT: Adapting BERT to E-commerce with Adaptive Hybrid Masking and Neighbor Product Reconstruction." arXiv preprint arXiv:2009.02835 (Sep. 2020). (Year: 2020).*
Carrillo-de-Albornoz, Jorge, Javier Rodriguez Vidal, and Laura Plaza. "Feature engineering for sentiment analysis in e-health forums." PloS one 13.11 (2018): e0207996. (Year: 2018).*
Coroiu, Adriana Mihaela, Alina Delia Calin, and Maria Nutu. "Topic modeling in medical data analysis. case study based on medical records analysis." 2019 International Conference on Software, Telecommunications and Computer Networks (SoftCOM). IEEE, 2019. (Year: 2019).*
Alsentzer et al., "Publicly Available Clinical BERT Embeddings," *Proceedings of the 2nd Clinical Natural Language Processing Workshop*, Minneapolis, Minnesota, USA, Jun. 7, 2019, pp. 72-78 (7 pages).
Delvin et al., "BERT: Pre-training of Deep Bidirectional Transformers for Language Understanding," *arXiv: 810.04805v2 [cs.CL]*, May 29, 2019, 16 pages.
Harkema et al., "Context: An Algorithm for Determining Negation, Experiencer, and Temporal Status from Clinical Reports," *J Biomed Inform.* 42(5): 839-851, 2009.
Mehrabi et al., "Deepen: A negation detection system for clinical text incorporating dependency relation into NegEx," *J. Biomed Inform.* 54:213-219, Apr. 2015.
Yi et al., "Sentiment Analyzer: Extracting Sentiments about Given Topic using Natural Language Processing Techniques," *Third IEEE International Conference on Data Mining*, Melbourne, Florida, USA, Nov. 22-22, 2003, 8 pages.

\* cited by examiner

PREDICTING TOPIC SENTIMENT USING A MACHINE LEARNING MODEL TRAINED WITH OBSERVATIONS IN WHICH THE TOPICS ARE MASKED

BACKGROUND

A noun phrase is a word or group of words that functions in a sentence or sentence fragment as subject, object, or prepositional object. A noun phrase is comprised of a noun and any modifiers applied to the noun. The noun phrases in the following sentences and fragments are underlined:

1. The patient complained of intermittentchestpain.
2. The patient denied cough.
3. The patient presented with skinlesions.
4. There was no evidence of pneumonia.
5. Past history of diabetes.
6. Family history of dementia.
7. The patient has chestpain but no palpitations.

In a variety of contexts, it can be useful to determine the sentiment that a sentence or sentence fragment communicates about a particular noun phrase. In this situation, a noun phrase that is being sentiment-qualified is referred to as a "topic." Each of the double-underlined noun phrases is a topic about which the sentence or sentence fragment advances a sentiment: sentences 1 and 3 advance a positive "assertion" sentiment for their topics; sentences 2 and 4 advance a negative "negation" sentiment for theirs; fragment 5 advances a "historical" sentiment; fragment 6 advances an "experienced by someone other than the patient" sentiment; fragment 7 advances the "assertion" sentiment for the topic "chest pain" and the "negation" sentiment for the topic "palpitations."

In certain conventional "distance" approaches to automatic sentiment identification, a software tool makes predictions about the sentiment expressed for a topic by using rules that match a negation word or phrase contained by the sentence against a negation dictionary, and determining a distance between that negation word or phrase and the topic.

DETAILED DESCRIPTION

Figure 1:
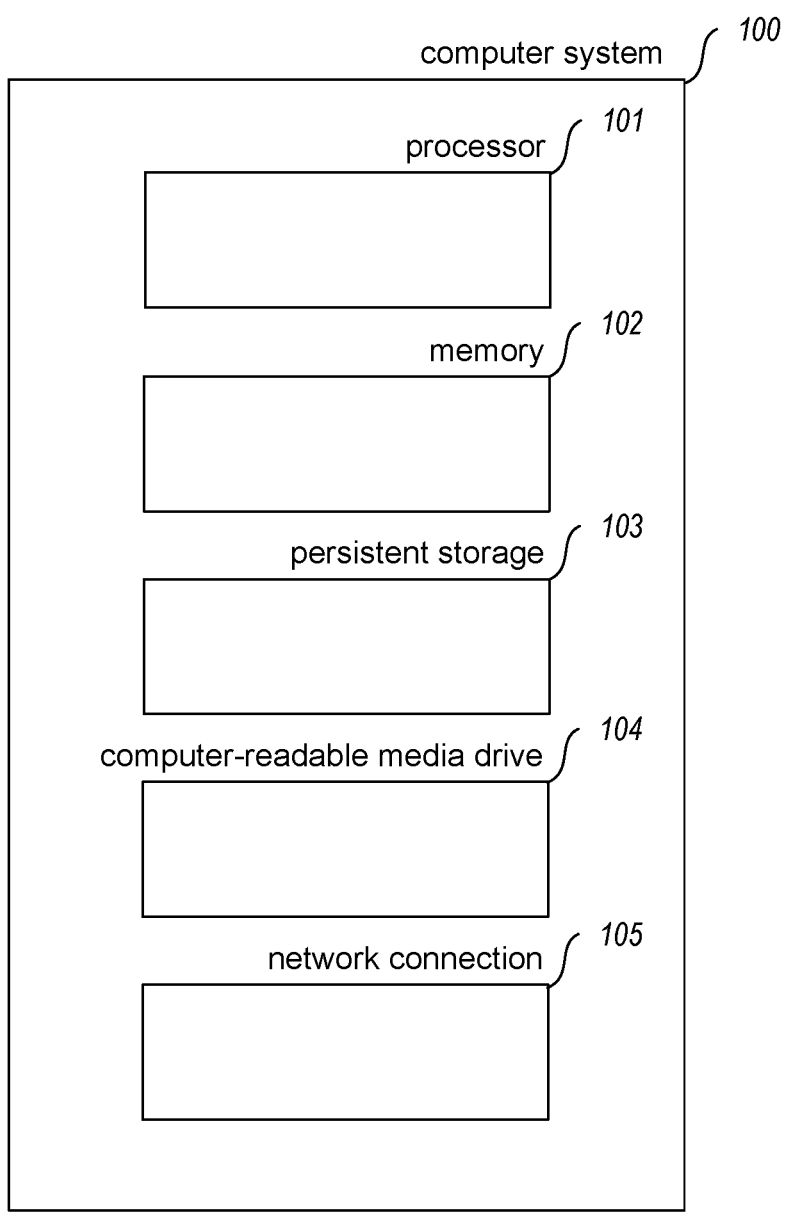
FIG. 1 is a block diagram showing some of the components typically incorporated in at least some of the computer systems and other devices on which the facility operates.

The inventors have identified disadvantages with conventional distance approaches to sentiment identification. In particular, these approaches require the manual creation, maintenance, and adaptation of both the ruleset and the negation dictionary. Further, the accuracy of these approaches often leave something to be desired.

In certain conventional machine learning approaches, supervised training observation sentences and sentence fragments whose accurate noun phrase sentiments are known are used to train a neural network. Particular sentences and sentence fragments whose noun phrase sentiments are unknown are then subjected to the trained neural network to predict their noun phrase sentiments.

The inventors have also identified disadvantages of the conventional machine learning approaches. In particular, the inventors have noted that, like the conventional distance approaches, the conventional machine learning approaches have lower-than-desired accuracy. By studying the inaccurate predictions produced by these approaches, the inventors have recognized that they tend to differentiate assertion sentiment from negation sentiment for a particular noun phrase based principally on the frequency with which the training observations that contain the noun phrase are labelled as assertion or negation. For example, if 30 of 200,000 training observations contain the noun phrase "subdural hematoma," and 26 of those 30 training observations are labeled as negation, the model will always predict the negation sentiment for sentences and fragments containing the noun phrase "subdural hematoma." While this prediction will typically be accurate a majority of the time (depending on how assertion/negation frequency in the training set corresponds to assertion/negation frequency in the prediction set for the noun phrase), it will be wrong for most or all prediction observations having the sentiment that was in the minority for training instances containing the same noun phrase.

In response to the inventors' recognition of these disadvantages, they have conceived and reduced to practice a software and/or hardware facility for predicting topic sentiment using a machine learning model trained with observations in which the noun phrases are masked ("the facility").

The facility receives a sentence or sentence fragment in which to identify a sentiment-qualified topic. In various embodiments, the topic is a named entity, noun, or other noun phrase. The topic may be a proper noun or a common noun, and may refer to a unique thing or idea, or a class of multiple similar or identical things or ideas. The facility first subjects the sentence or sentence fragment (hereafter referred to as "the text") to named entity recognition techniques to identify topics it contains whose sentiment-qualification could be helpful. For each recognized topic, the facility (1) masks the topic to replace it in the text with an arbitrary identifier, and (2) subjects the modified text to a neural network trained to predict sentiment for masked topics. This is more effective than training and applying neural networks on text where the topics are not masked, which tend to answer based on the dominant sentiment for the topic in texts used to train the model.

By performing in some or all of the ways discussed above, the facility attributes sentiments to topics more accurately than conventional techniques.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with less latency, and/or preserving more of the conserved resources for use in performing other tasks or additional instances of the same task. As one example, the facility is able to use smaller models than conventional machine learning techniques, reducing the processing resources needed to train and evaluate the models, and the storage resources needed to store the models.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
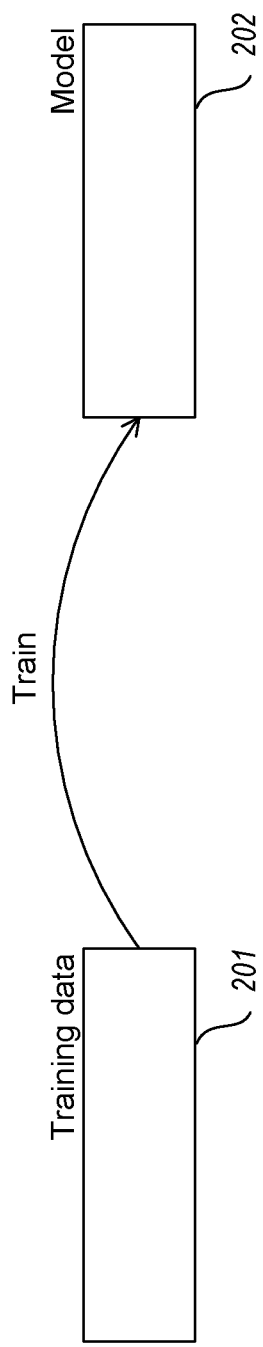
FIG. 2 is a data flow diagram showing the facility's training of its sentiment recognition model.

FIG. 2 is a data flow diagram showing the facility's training of its sentiment recognition model. The diagram shows the facility using training data 201 to train the model 202. This process is described in greater detail in connection with FIG. 3 below.

Figure 3:
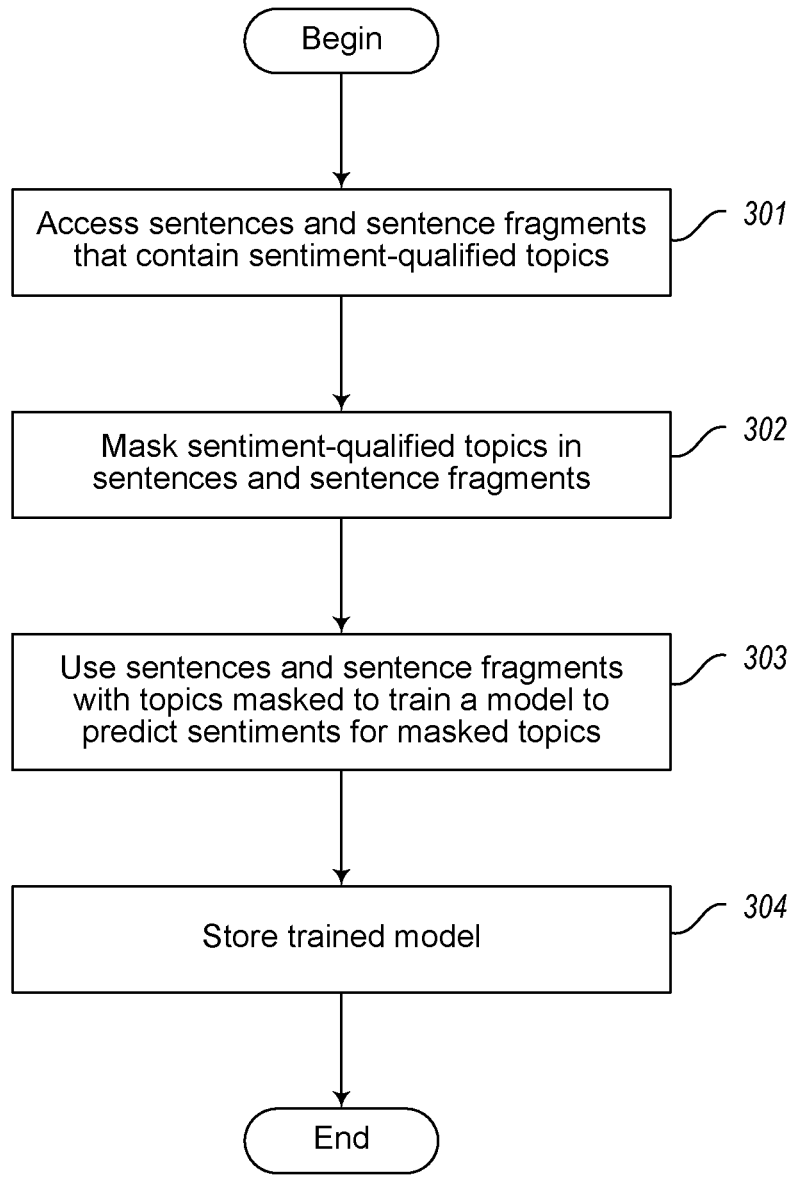
FIG. 3 is a flow diagram showing a process performed by the facility to train its model.

FIG. 3 is a flow diagram showing a process performed by the facility to train its model. In act 301, the facility access sentences and sentence fragments that contain sentiment-qualified topics. Table 1 below shows a sample sentence containing sentiment-qualified topics that are accessed by the facility.

facility's masking of the "chest pain" topic by replacing it with a masking string "XXX". The facility similarly replaces the "shortness of breath" topic with the masking string "XXX". In various embodiments, the facility uses different masking strings, such as the masking string "[MASK]" supported by the BERT language model. In some embodiments, the masking string used by the facility to replace a particular topic is sensitive to the number of words or other tokens in the topic, such as "XXX XXX XXX" for the three-word topic "shortness of breath." The sentence continues to include the sentiment and entity class qualifications for the masked topics.

In act 303, the facility uses the sentences and sentence fragments produced in act 302 to train a model to predict sentiments for masked topics. In various embodiments, the facility uses a variety of model types. In some embodiments, the facility uses a Clinical Bidirectional Encoder Representations from Transformers ("ClinicalBERT") model, or a Bidirectional Encoder Representations from Transformers ("BERT") model of another type. BERT and ClinicalBERT models, respectively, are described in further detail by the following, each of which is hereby incorporated by reference in its entirety: Jacob Devlin, Ming-Wei Chang, Kenton Lee, and Kristina Toutanova, BERT: Pre-training of Deep Bidirectional Transformers for Language Understanding, 2018, available at arxiv.org/abs/1810.04805v2; and Emily Alsentzer, John Murphy, William Boag, Wei-Hung Weng, Di Jindi, Tristan Naumann, and Matthew McDermott, Publicly Available Clinical BERT Embeddings, Proceedings of the 2nd Clinical Natural Language Processing Workshop, 2019, pp. 72-78, available at www.aclweb.org/anthology/W19-1909. Where a document incorporated herein by reference conflicts with the present application, the present application controls.

In act 304, the facility stores the model trained in act 303. After act 304, the process concludes.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 4:
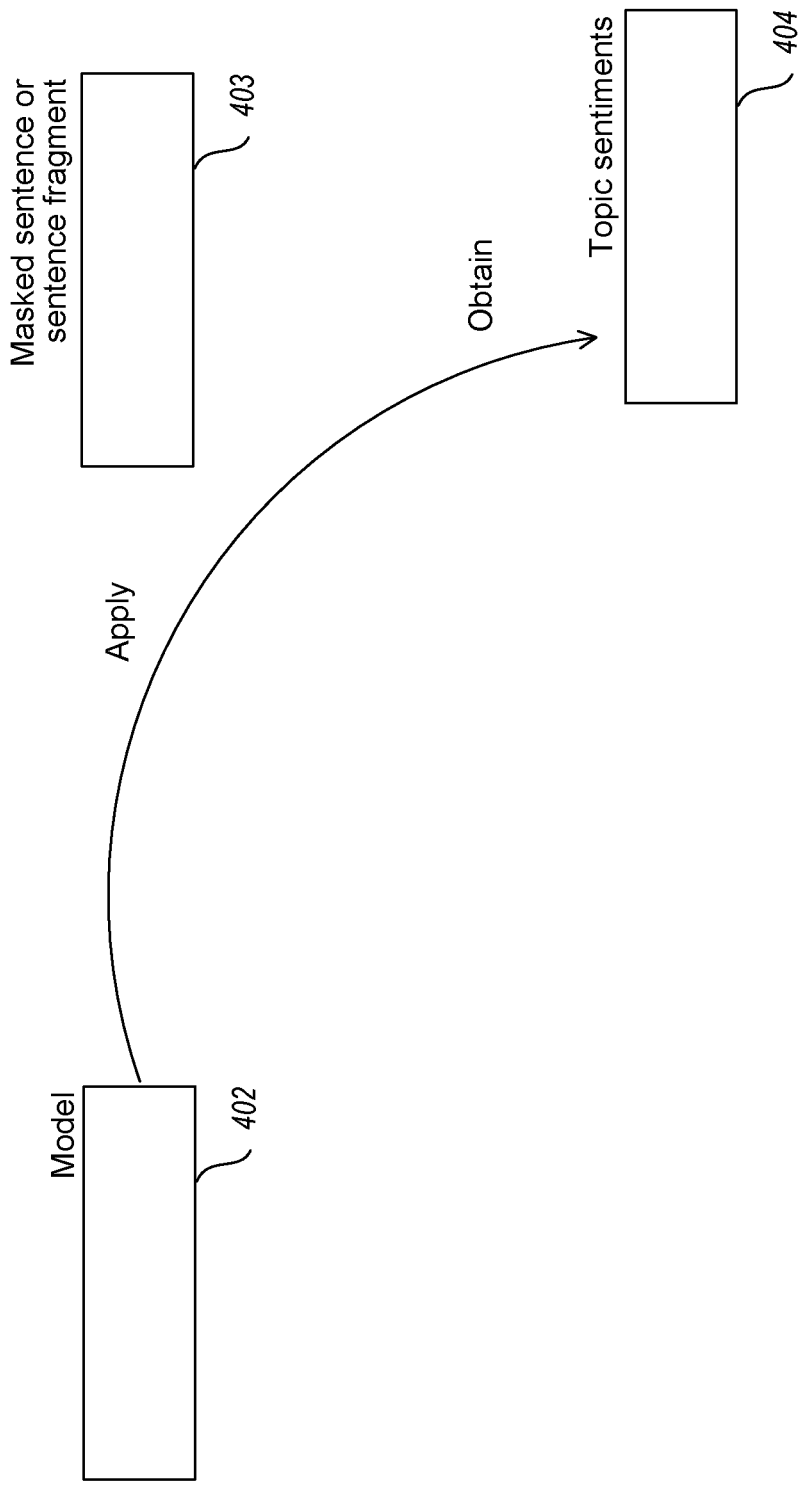
FIG. 4 is a data flow diagram showing the facility's application of the model to predict sentiments of topics occurring in a sentence or sentence fragment.

FIG. 4 is a data flow diagram showing the facility's application of the model to predict sentiments of topics occurring in a sentence or sentence fragment. The diagram shows the facility's application of the model 402 to a masked sentence or sentence fragment 403. This application of the model produces sentiments 404 for topics occurring in

TABLE 1

| | |
|---|---|
| 1 | "Patient has chest pain <SYMPTOM; ASSERTION> but no shortness of breath <SYMPTOM; NEGATIONS>." |
| 2 | "Patient has XXX <SYMPTOM; ASSERTION> but no XXX <SYMPTOM; NEGATIONS>." |

In particular, the accessed sentence is shown on line 1 of Table 1. It can be seen that the topic "chest pain" is qualified with the sentiment "assertion", and the topic "shortness of breath" is qualified with the sentiment "negation". It can also be seen that these topics are qualified with entity classes of the topics: they're both shown to be of the "symptom" entity class In act 302, the facility masks the sentiment-qualified topics in the sentences and sentence fragments accessed in act 301. To continue the example, line 2 of Table 1 shows the the sentence or sentence fragment. This process is described in greater detail below in connection with FIG. 5.

Figure 5:
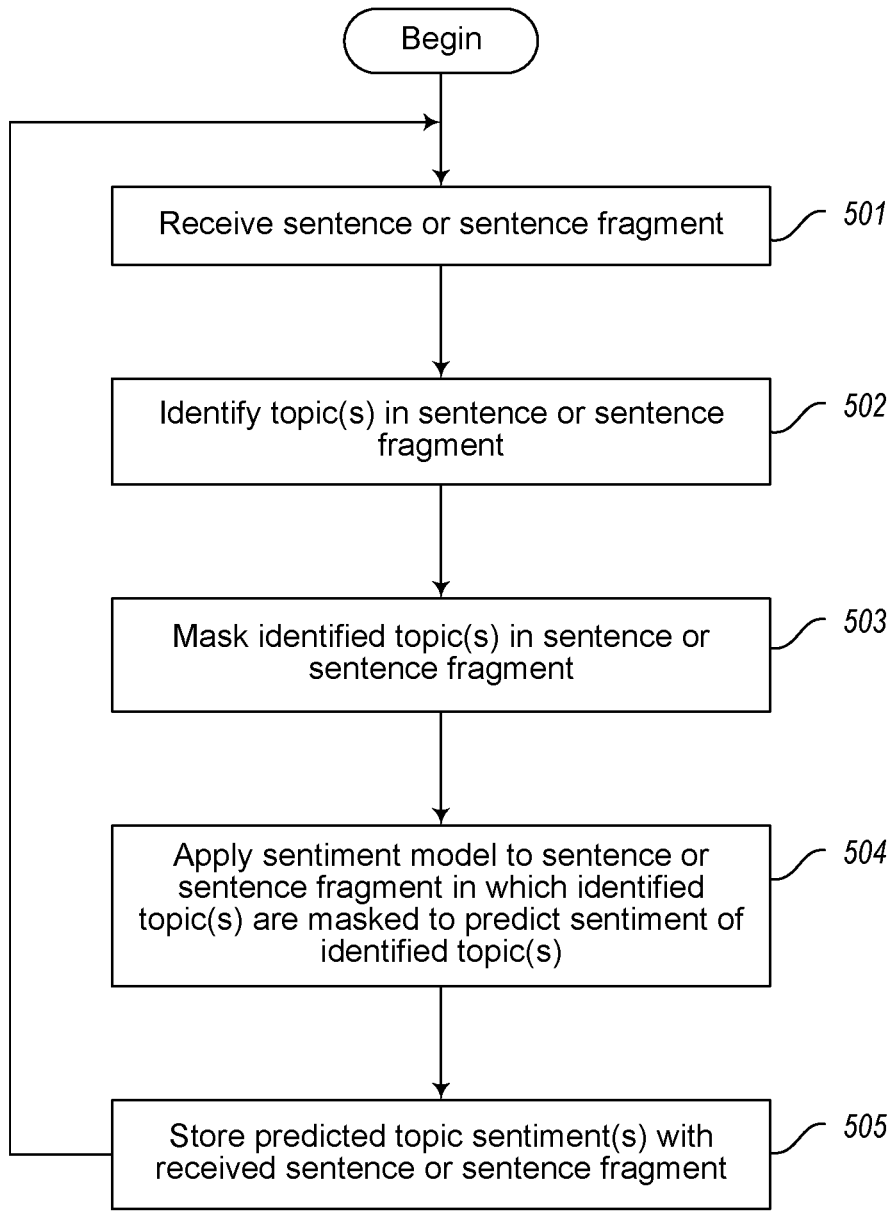
FIG. 5 is a flow diagram showing a process performed by the facility in order to predict sentiments for one or more topics that occur in a sentence or sentence fragment.

FIG. 5 is a flow diagram showing a process performed by the facility in order to predict sentiments for one or more topics that occur in a sentence or sentence fragment. In act 501, the facility receives a sentence or sentence fragment. A sample sentence received by the facility in act 501 is shown below in Table 2.

TABLE 2

| | |
|---|---|
| 1 | "Patient denies chest pain, dyspnea, reports palpitations; no orthopnea." |
| 2 | "Patient denies <u>chest pain</u>, <u>dyspnea</u>, reports <u>palpitations</u>; no <u>orthopnea</u>." |
| 3 | "Patient denies <u>chest pain</u> <SYMPTOM>, <u>dyspnea</u> <SYMPTOM>, reports <u>palpitations</u> <SYMPTOM>; no <u>orthopnea</u> <SYMPTOM>." |
| 4 | "Patient denies <u>XXX</u> <SYMPTOM>, <u>XXX</u> <SYMPTOM>, <u>XXX</u> <SYMPTOM>; no <u>XXX</u> <SYMPTOM>." |
| 5 | "Patient denies <u>XXX</u> <SYMPTOM; NEGATION>, <u>XXX</u> <SYMPTOM; NEGATION>, reports <u>XXX</u> <SYMPTOM; ASSERTION>; no <u>XXX</u> <SYMPTOM; NEGATION>." |
| 6 | "Patient denies <u>chest pain</u> <SYMPTOM; NEGATION>, <u>dyspnea</u> <SYMPTOM; NEGATION>, reports <u>palpitations</u> <SYMPTOM; ASSERTION; no <u>orthopnea</u> <SYMPTOM; NEGATION>." |

In particular, in the example, the facility receives a sentence shown in line 1 of Table 2.

In act 502, the facility identifies any topics received in sentence or sentence fragment received in act 501 for which sentiments are to be determined. To continue the example, line 2 of Table 2 shows by underlining four topics that the facility has identified in act 502. In some embodiments, the facility performs act 502 by comparing each substring of the sentence to a list of topics or other named entities editorially specified for the domain; extracted from corpora of documents relating to the domain, etc. In some embodiments, the facility performs a largest-first comparison of the substrings to identify longer, multi-word topics to the exclusion of included shorter topics. In various embodiments, the facility uses a variety of topic and/or named entity identification techniques. In some embodiments, the facility uses a machine learning model to perform this act. In various embodiments, a machine learning model used to identify topics is the same or different from a machine learning model used by the facility to predict sentiments of topics.

In some embodiments, the identification of topics performed by the facility in act 502 includes the identification of entity classes of those topics. For example, line 3 of Table 2 shows the facility's identification of the "symptom" entity class for each of the four identified topics. In various embodiments, the facility uses a variety of approaches to identify these entity classes. For example, in some embodiments, the facility retrieves the entity classes from a topic list used to identify the topics. In some embodiments, the facility uses a machine learning model to perform this act. In various embodiments, a machine learning model used to identify the entity class of topics is the same or different from a machine learning model used by the facility to predict sentiments of topics.

In act 503, the facility masks the topics identified in act 502 in the sentence or sentence fragment. This masking involves replacing each identified topic with a masking string identifying the position of the topic in the sentence, but giving no information about the identity of the topic. For example, line 4 of Table 2 shows the replacement of each of the four identified topics with the masking string "XXX". In act 504, the facility applies the trained sentiment model to the sentence or sentence fragment in which the identified topics are masked in order to predict the sentiment of the identified topics. Line 5 of Table 2 shows the facility's prediction of the "assertion" sentiment for the instance of the masking string in the position corresponding to the "palpitation" topic; and its prediction of the "negation" sentiment for the three masking strings corresponding to the positions of the "chest pain", "dyspnea", and "orthopnea" topics.

In act 505, the facility stores the topic sentiments predicted in act 504 with the sentence or sentence fragment in the original form in which it was received, i.e., the forms in which the topics are present and have not been masked. For example, line 6 of Table 2 shows each topic together with the sentiment that the facility has predicted for it. In various embodiments, the facility uses the predicted topic sentiments for a variety of purposes, including sentence diagramming or parsing, natural language understanding, natural language summarization, matching among different patient's medical conditions or history, comparison of the patient's medical condition to triaging or diagnosis criteria, etc. After act 505, the facility continues in act 501 to receive and process the next sentence or sentence fragment.

Table 3 below shows the facility's processing of a second sample sentence.

TABLE 3

| | |
|---|---|
| 1 | "If you have fever or worsening cough, return to the ED." |
| 2 | "If you have <u>fever</u> or worsening <u>cough</u>, return to the ED." |
| 3 | "If you have <u>fever</u> <SYMPTOM> or worsening <u>cough</u> <SYMPTOM>, return to the ED." |
| 4 | "If you have <u>XXX</u> <SYMPTOM> or worsening <u>XXX</u> <SYMPTOM>, return to the ED." |
| 5 | "If you have <u>XXX</u> <SYMPTOM, HYPOTHETICAL> or worsening <u>XXX</u> <SYMPTOM, HYPOTHETICAL>, return to the ED." |
| 6 | "If you have <u>fever</u> <SYMPTOM, HYPOTHETICAL> or worsening <u>cough</u> <SYMPTOM, HYPOTHETICAL>, return to the ED." |

It can be seen in Table 3 that the facility predicts the sentiment "hypothetical" for both the topic "fever" and the topic "cough".

Table 4 below shows a third example.

TABLE 4

1 "Fever and cough resolved with ceftriaxone."
2 "Fever and cough resolved with ceftriaxone."
3 "Fever <SYMPTOM> and cough <SYMPTOM> resolved with ceftriaxone <MEDICATION>."
4 "XXX <SYMPTOM> and XXX <SYMPTOM> resolved with XXX <MEDICATION>."
5 "XXX <SYMPTOM, HISTORICAL> and XXX <SYMPTOM, HISTORICAL> resolved with XXX <MEDICATION, HISTORICAL>."
6 "Fever <SYMPTOM, HISTORICAL> and cough <SYMPTOM, HISTORICAL> resolved with ceftriaxone <MEDICATION, HISTORICAL>."

It can be seen from Table 4 that the facility predicts the sentiment "historical" for each of the three topics "fever", "cough", "ceftriaxone".

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more memories collectively having contents configured to cause a computing system to perform a method, the one or more memories not constituting a propagating transitory data signal, the method comprising:
  receiving, by a processor of the computing system, a plurality of training natural-language text strings;
  identifying, by the processor of the computing system, one or more noun phrases in each of the plurality of training natural-language text strings;
  determining, by the processor of the computing system, one or more sentiment-qualified topics based on the one or more noun phrases;
  determining, by the processor of the computing system, an entity class for each of the one or more sentiment-qualified topics;
  modifying, by the processor of the computing system, each training natural-language text string to preserve a location of each sentiment-qualified topic in each training natural-language text string while replacing all information about an identity of each sentiment-qualified topic;
  using, by the processor of the computing system, the modified plurality of training natural-language strings and the entity class for each of the one or more sentiment-qualified topics to train a machine learning model to determine a sentiment of each sentiment-qualified topic by at least performing a largest-first comparison of substrings of each of the plurality of training natural-language text strings to identify longer, multi-word topics to an exclusion of included shorter topics, and comparing the longer, multi-word topics to a list of topics or named entities specified for a domain; and
  storing, by the processor of the computing system, the sentiment with each training natural-language text string by restoring the identity and using the location associated with each sentiment-qualified topic in each training natural-language text string.

2. The one or more memories of claim 1, the method further comprising:
  initializing the machine learning model as a Bidirectional Encoder Representations from Transformers model.

3. The one or more memories of claim 1, the method further comprising:
  initializing the machine learning model as a Clinical Bidirectional Encoder Representations from Transformers model.

4. A method in a computing system, the method comprising:
  receiving, by a processor of the computing system, a plurality of training natural-language text strings;
  identifying, by the processor of the computing system, one or more noun phrases in each of the plurality of training natural-language text strings;
  determining, by the processor of the computing system, one or more sentiment-qualified topics based on the one or more noun phrases;
  determining, by the processor of the computing system, an entity class for each of the one or more sentiment-qualified topics;
  modifying, by the processor of the computing system, each training natural-language text string to preserve a location of each sentiment-qualified topic in each training natural-language text string while replacing all information about an identity of each sentiment-qualified topic;
  using, by the processor of the computing system, the modified plurality of training natural-language strings and the entity class for each of the one or more sentiment-qualified topics to train a machine learning model to determine a sentiment of each sentiment-qualified topic by at least performing a largest-first comparison of substrings of each of the plurality of training natural-language text strings to identify longer, multi-word topics to an exclusion of included shorter topics, and comparing the longer, multi-word topics to a list of topics or named entities specified for a domain; and
  storing, by the processor of the computing system, the sentiment with each training natural-language text string by restoring the identity and using the location associated with each sentiment-qualified topic in each training natural-language text string.

5. The method of claim 4, the method further comprising:
  initializing the machine learning model as a Bidirectional Encoder Representations from Transformers model.

6. The method of claim 4, the method further comprising:
  initializing the machine learning model as a Clinical Bidirectional Encoder Representations from Transformers model.

7. The method of claim 4, wherein the topic to which the training natural-language text strings is related is a distinguished domain of expression, the method further comprising:
- receiving a subject input text string related to the distinguished domain of expression;
- masking an intent expressed by the subject text string for each of one or more masked noun phrases and one or more entity classes determined for each of the masked noun phrases for which an intent is identified; and
- applying the trained model to the masked subject input text string to predict a sentiment for each masked noun phrase of the subject input text string.

8. A system comprising:
- at least one processor; and
- at least one memory, the at least one memory not constituting a transitory propagating data signal, wherein the at least one memory is configured to cause the at least one processor to:
- receive a plurality of training natural-language text strings;
- identify one or more noun phrases in each of the plurality of training natural-language text strings;
- determine one or more sentiment-qualified topics based on the one or more noun phrases;
- determine an entity class for each of the one or more sentiment-qualified topics:
- modify each training natural-language text string to preserve a location of each sentiment-qualified topic in each training natural-language text string while replacing all information about an identity of each sentiment-qualified topic;
- use the modified plurality of training natural-language strings and the entity class for each of the one or more sentiment-qualified topics to train a machine learning model to determine a sentiment of each sentiment-qualified topic by at least performing a largest-first comparison of substrings of each of the plurality of training natural-language text strings to identify longer, multi-word topics to an exclusion of included shorter topics, and comparing the longer, multi-word topics to a list of topics or named entities specified for a domain; and
- store the sentiment with each training natural-language text string by restoring the identity and using the location associated with each sentiment-qualified topic in each training natural-language text string.

9. The system of claim 8, wherein the at least one processor is further configured to initialize the machine learning model as a Bidirectional Encoder Representations from Transformers model.

10. The system of claim 8, wherein the at least one processor is further configured to initialize the machine learning model as a Clinical Bidirectional Encoder Representations from Transformers model.

11. The system of claim 8, wherein the topic to which the training natural-language text strings is related is a distinguished domain of expression, wherein the at least one processor is further configured to:
- receive a subject input text string related to the distinguished domain of expression;
- mask an intent expressed by the subject text string for each of one or more masked noun phrases and one or more entity classes determined for each of the masked noun phrases for which an intent is identified; and
- apply the trained model to the masked subject input text string to predict a sentiment for each masked noun phrase of the subject input text string.

\* \* \* \* \*